(12) United States Patent
Shiraishi et al.

(10) Patent No.: US 7,260,275 B2
(45) Date of Patent: Aug. 21, 2007

(54) IMAGE PROCESSING DEVICE, IMAGE PROCESSING PROGRAM AND IMAGE COMPOSING METHOD

(75) Inventors: Iwao Shiraishi, Nagareyama (JP); Takahiro Fukuhara, Yokosuka (JP)

(73) Assignee: Minolta Co., Ltd., Osaka-Shi, Osaka (JP)

( * ) Notice: Subject to any disclaimer, the term of this patent is extended or adjusted under 35 U.S.C. 154(b) by 773 days.

(21) Appl. No.: 10/673,240

(22) Filed: Sep. 30, 2003

(65) Prior Publication Data
US 2005/0018919 A1 Jan. 27, 2005

(30) Foreign Application Priority Data
Jul. 25, 2003 (JP) ............................. 2003-201865

(51) Int. Cl.
G06K 9/36 (2006.01)
(52) U.S. Cl. ...................... 382/284; 382/245; 382/294; 358/540; 358/426.13; 341/67
(58) Field of Classification Search ................ 382/235, 382/243, 245, 246, 282, 284, 294; 358/540, 358/450, 426.13; 341/65, 67
See application file for complete search history.

(56) References Cited

U.S. PATENT DOCUMENTS

| 6,141,446 | A * | 10/2000 | Boliek et al. | ................. | 382/233 |
| 6,456,340 | B1 * | 9/2002 | Margulis | ..................... | 348/745 |
| 6,549,666 | B1 * | 4/2003 | Schwartz | ..................... | 382/233 |
| 6,657,631 | B1 * | 12/2003 | Schinnerer | ................... | 345/502 |
| 6,754,394 | B2 * | 6/2004 | Boliek et al. | ................. | 382/240 |

FOREIGN PATENT DOCUMENTS

| EP | 0 598 995 A1 | 6/1994 |
| JP | 6-164950 | 6/1994 |
| JP | 07-298033 | 11/1995 |
| JP | 7-336675 | 12/1995 |
| JP | 2000-069272 | 3/2000 |
| JP | 2002-271791 | 9/2002 |
| JP | 2003-46738 | 2/2003 |

OTHER PUBLICATIONS

Notification of Reasons for Refusal issued in a corresponding Japanese application and translation thereof.

* cited by examiner

*Primary Examiner*—Yosef Kassa
(74) *Attorney, Agent, or Firm*—Buchanan Ingersoll & Rooney PC

(57) ABSTRACT

An image processing device, an image processing program and an image processing method for forming a composite image by superimposing an overlay image on a base image. Fixed length compressed image of the base image fixed length compressed data of the overlay image are formed by dividing data of the base image and data of the overlay image respectively into a plurality of blocks and by encoding a statistical parameter of each block, including a gray level representing the block, and quantization levels of respective pixels in the block. Then, while the fixed length compressed data is being checked in a block-by-block manner, the fixed length compressed data of the base image is taken in if the gray level of the block of the overlay image is 0, and the fixed length compressed data of the overlay image is taken in if the gray level of the block of the overlay image is not 0.

17 Claims, 16 Drawing Sheets bmp DATA

The subscripts 0~f are pixel numbers in a block.

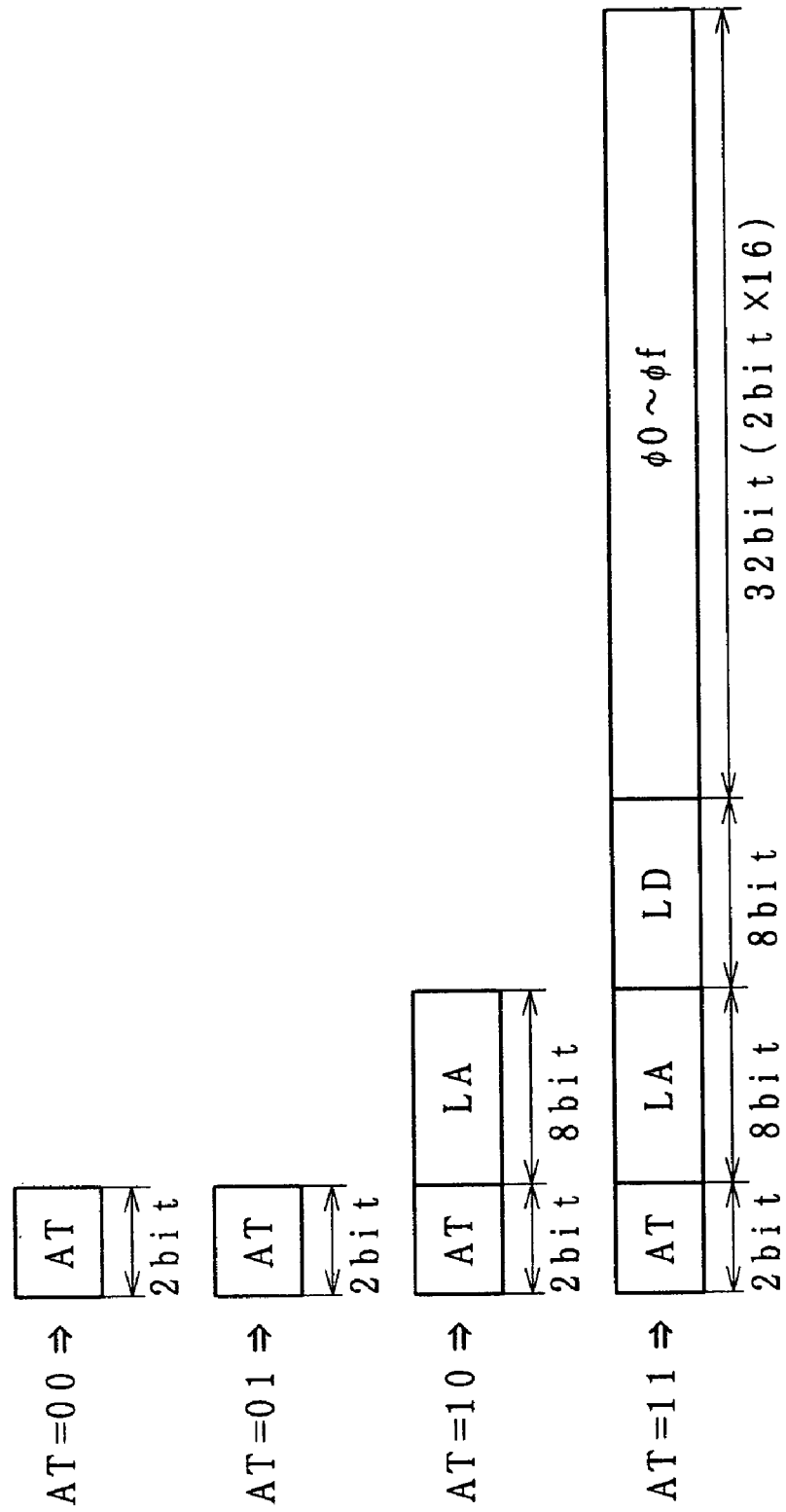

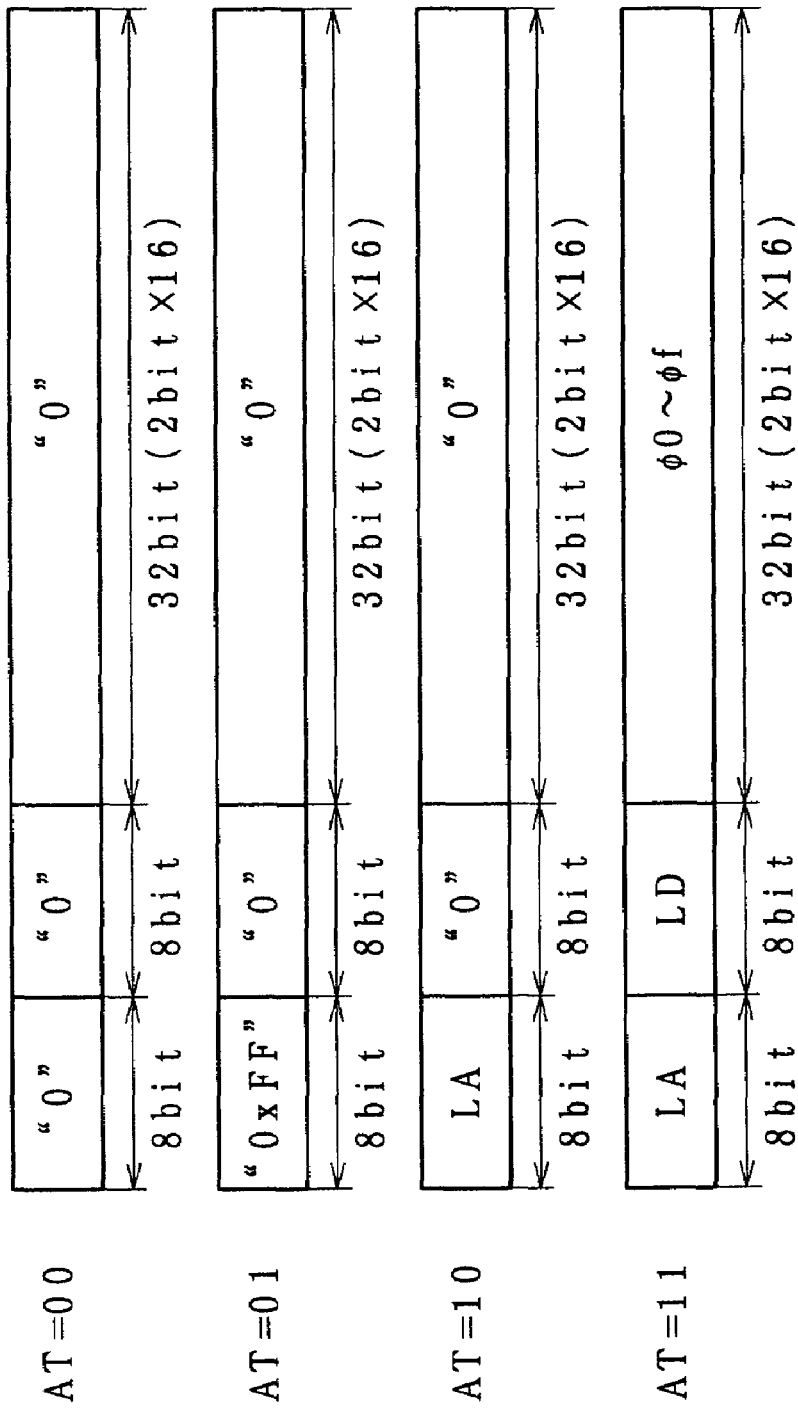

FIG. 10
EXPANSION OF COMPOSITE DATA
COMBINED FIXED LENGTH COMPRESSED DATA
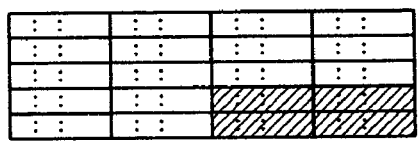
FIXED LENGTH COMPRESSED DATA OF BASE IMAGE
FIXED LENGTH COMPRESSED DATA OF OVERLAY IMAGE
EXPANSION
COMPOSITE IMAGE 30
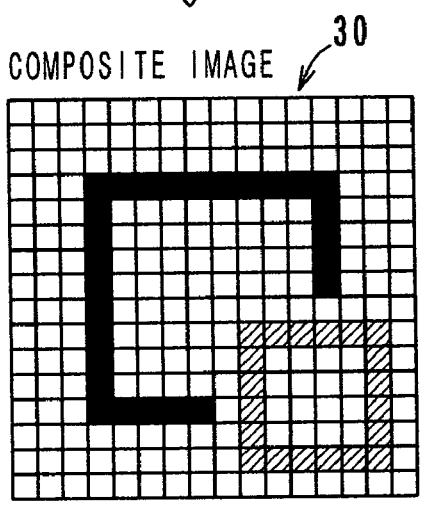
Image composition is performed block by block (4x4 pixels).
→BASE IMAGE REPRODUCED
→OVERLAY IMAGE REPRODUCED

IMAGE PROCESSING DEVICE, IMAGE PROCESSING PROGRAM AND IMAGE COMPOSING METHOD

This application is based on Japanese Patent Application No. 2003-201865 filed on Jul. 25, 2003, the content of which is hereby incorporated by reference.

BACKGROUND OF THE INVENTION

1. Field of the Invention

The present invention relates to an image processing device, an image processing program and an image combining method, and more particularly to an image processing device, an image processing program and an image combining method for forming a composite image by superimposing an overlay image on a base image.

2. Description of Related Art

In recent years, with respect to image data which is stored to be printed or for other purposes, various kinds of image data compressing methods for reducing the volume of the stored data have been suggested. Also, various kinds of methods for combining two or more images have been suggested.

An example of forming and printing composite images is inset printing, in which changeable overlay images (for example, seat numbers) are superimposed on a fixed base image (for example, a theater ticket), and the formed composite images are succesively printed.

Japanese Patent Laid-Open Publication Nos. 2003-46738 (Reference 1), 6-164950 (Reference 2), 2002-271791 (Reference 3) and 7-336675 (Reference 4) disclose data encoding methods of GBTC type. In these methods, image data is divided into a plurality of blocks, and for each block, a statistical parameter, such as a gray level representing the block, and quantization levels of the respective pixels in the block are encoded to form compressed data with a fixed length.

Reference 4 discloses a method for forming a composite image by superimposing an image B on an image A. In this method, if a block of the image B completely covers a block of the previously written image A, the encoded data of the block of the image A is updated (see paragraph 0007 of Reference 4).

In other words, in the method disclosed by Reference 4, since the image B has priority over the image A, in the region of the image B, the image A is completely deleted. Therefore, if the image A and the image B are of the same size, the base image A will be wholly deleted.

In the case of the above-mentioned inset printing, if the base image and the overlay image are of the same size, or if the overlay image is relatively large, according to the method disclosed by Reference 4, the entire or a large part of the base image A will be deleted.

SUMMARY OF THE INVENTION

An object of the present invention is to provide an image processing device, an image processing program and an image composing method which permit efficient image data storage/transmission and efficient image composition and which permit only a necessary part of an overlay image to be superimposed on a base image.

In order to attain the object, according to a first aspect of the present invention, an image processing device for forming a composite image by superimposing an overlay image on a base image, said image processing device comprises: a fixed length data forming section for forming fixed length compressed data of the base image and fixed length compressed data of the overlay image by dividing data of the base image and data of the overlay image respectively into a plurality of blocks and by encoding a statistical parameter of each block, including a gray level representing the block, and quantization levels of respective pixels in the block; and an image composing section for forming fixed length compressed data of a composite image by, while checking the fixed length compressed data of the base image and the fixed length compressed data of the overlay image in a block-by-block manner, taking in the fixed length compressed data of the base image if the gray level of the block of the overlay image is 0 and taking in the fixed length compressed data of the overlay image if the gray level of the block of the overlay image is not 0.

According to a second aspect of the present invention, an image processing program for commanding a computer to form a composite image by superimposing the overlay image on the base image, said program comprising the steps of forming fixed length compressed data of the base image and fixed length compressed data of the overlay image by dividing data of the base image and data of the overlay image respectively into a plurality of blocks and by encoding a statistical parameter of each block, including a gray level representing the block, and quantization levels of respective pixels in the block; and forming fixed length compressed data of a composite image by, while checking the fixed length compressed data of the base image and the fixed length compressed data of the overlay image in a block-by-block manner, taking in the fixed length compressed data of the base image if the gray level of the block of the overlay image is 0 and taking in the fixed length compressed data of the overlay image if the gray level of the block of the overlay image is not 0.

According to a third aspect of the present invention, an image processing method for forming a composite image by superimposing an overlay image on a base image, said method comprising the steps of: forming fixed length compressed data of the base image and fixed length compressed data of the overlay image by dividing data of the base image and data of the overlay image respectively into a plurality of blocks and by encoding a statistical parameter of each block, including a gray level representing the block, and quantization levels of respective pixels in the block; and forming fixed length compressed data of a composite image by, while checking the fixed length compressed data of the base image and the fixed length compressed data of the overlay image in a block-by-block manner, taking in the fixed length compressed data of the base image if the gray level of the block of the overlay image is 0 and taking in the fixed length compressed data of the overlay image if the gray level of the block of the overlay image is not 0.

In the image processing device, program and method according to the first, second and third aspects, the base image and the overlay image are combined with each other in the stage of fixed length compressed data, and therefore, storage/transmission of image data can be carried out efficiently and speedily. Consequently, printing efficiency is improved. In the image composing section or step for forming fixed length compressed data of a composite image, while the fixed length compressed data is checked in a block-by-block manner, the fixed length compressed data of the base image is taken in if the gray level of the block of the overlay image is 0, and the fixed length compressed data of the overlay image is taken in if the gray level of the block of the overlay image is not 0. Thus, while priority is on the imaged portion of an overlay image, the base image is maintained in the non-imaged portions of the overlay image. Consequently, in the formed composite image, only the imaged portions of the overlay image are superimposed on the base image, and there is no possibility that the base image may be deleted unnecessarily.

According to the first, second and third aspect, further, a variable length compressed data forming section or a step which converts the combined fixed length compressed data into variable length compressed data by quantizing the pixels of the block may be provided. By converting the fixed length compressed data into variable length compressed data, the volume of data is further reduced, and the efficiency of data storage/transmission can be improved.

The base image and the overlay image may be of the same size. Even in this case, the deletion of the entire base image will not occur.

According to the first, second and third aspects, when there are a plurality of overlay images to be combined with one base image, the overlay images are superimposed on the base image successively, and thus, inset printing is carried out efficiently.

Image data is usually expressed by bit map data. When the overlay image is expressed by bit map data, the bit map data is converted into fixed length compressed data. When the base image is expressed by bit map data, the bit map data is converted into fixed length compressed data.

The base image may be expressed by fixed length compressed data or by variable length compressed data. When the base image is expressed by variable length compressed data, the variable length compressed data is expanded to fixed length compressed data, and the fixed length compressed data of the base image is combined with the fixed length compressed data of the overlay image.

BRIEF DESCRIPTION OF THE DRAWINGS

This and other objects and features of the present invention will be apparent from the following description with reference to the accompanying drawings, in which:

FIG. 6 is a chart which shows variable length compressed data;

FIG. 7 is a chart which shows fixed length compressed data expanded from variable length compressed data;

FIG. 10 is a chart which shows expansion of composite fixed length compressed data into bmp data;

DETAILED DESCRIPTION OF THE PREFERRED EMBODIMENTS

Image processing devices, image processing programs and image composing methods according to preferred embodiments of the present invention are described with reference to the accompanying drawings.

Compression and Expansion by GBTC

First, GBTC (generalized block truncation coding) which is a basis of an image composing method according to the present invention is described.

In the present embodiment, image data compression by GBTC includes fixed length compression and variable length compression. In fixed length compression, multi-value bit map (bmp) image data (for example, eight bits per pixel) is divided into a plurality of blocks such that each block includes, for example, 4×4 pixels, and each block which thus includes 16 bytes is compressed to six bytes. In variable length compression, a parameter which indicates, for example, that all the pixels in the block are of the same gray level is quantized, and data is further compressed.

The GBTC compressed data is irreversible to the multi-value bmp data, and it is possible that part of gray level data may be lost. However, when data which was once compressed and expanded by GBTC is compressed and expanded by GBTC again, deterioration of picture quality is not caused. Fixed length compressed data and variable length compressed data are reversible to each other.

Fixed Length Compression of bmp Data

As the first process of data compression by GBTC, fixed length compression of bmp data is described. The fixed length compression is executed following the steps (A1) to (A5) described below.

Figure 1:
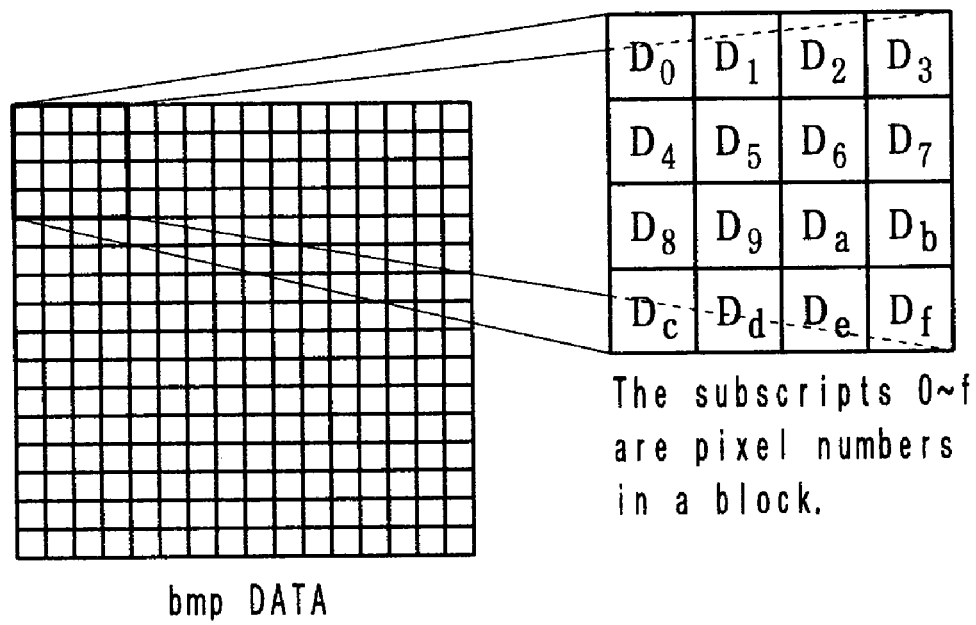
FIG. 1 is a chart which schematically shows extraction of a block from bmp data.

At step (A1), 4×4 pixels are extracted as one block from the bmp data. FIG. 1 schematically shows this extraction.

Figure 2:
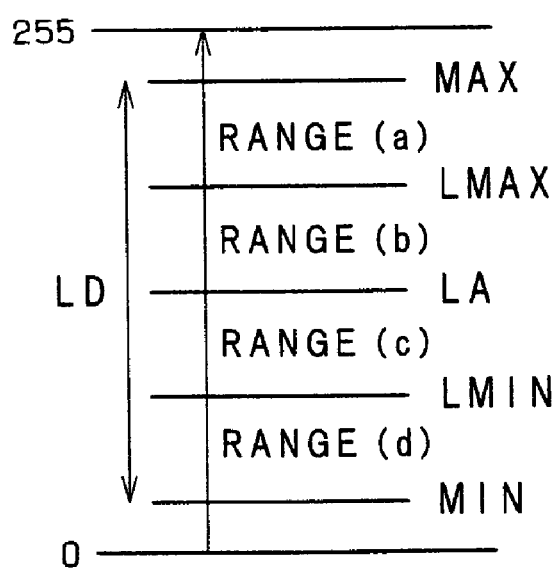
FIG. 2 is a chart which shows a way of calculating an average gray level and a gray level width of a block.

At step (A2), the average gray level and the gray level width of the block (16 pixels) are calculated. More specifically, the maximum and the minimum of the gray levels of the 16 pixels are calculated, and the middle between the maximum and the minimum is calculated as the average gray level of the block. Also, the difference between the maximum and the minimum is calculated as the gray level width of the block. Then, the gray level width is divided into quarters (see FIG. 2). A range (a) is from the maximum to a quarter less. A range (b) is from the average level to a quarter more, and a range (c) is from the average level to a quarter less. A range (d) is from the minimum to a quarter more.

The maximum gray level of the block is MAX, the minimum gray level of the block is MIN, the average gray level is LA, the gray level width is LD, the minimum value of the highest quarter of the LD is LMAX, and the maximum value of the lowest quarter of the LD is LMIN. Then, the following expressions are formed. "Di" means a pixel.

$$MAX=MAX(Di)$$

$$MIN=MIN(Di)$$

$$LA=(MAX+MIN)/2$$

$$LD=MAX-MIN$$

$$LMAX=(3MAX+MIN)/4$$

$$LMIN=(MAX+3MIN)/4$$

Figure 3:
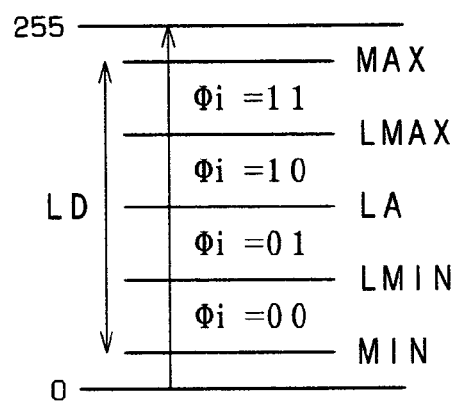
FIG. 3 is a chart which shows conversion of the gray levels of the respective pixels in a block into two-bit codes.

At step (A3), the gray level of each pixel in the block is converted into a two-bit code. More specifically, the gray levels of the pixels are classified into the ranges (a) through (d) and are converted into the corresponding two-bit codes (see FIG. 3). If the gray level of a pixel is within the range (a), it is converted into 11; if the gray level is within the range (b), it is converted into 10; if the gray level is within the range (c), it is converted into 01; and if the gray level is within the range (d), it is converted into 00.

Therefore, if a pixel is denoted by Di and if a two-bit code is denoted by φi, there are the following relationships:
if LMAX<Di≦MAX, then φi=11;
if LA<Di≦LMAX, then φi=10;
if LMIN<Di≦LA, then φi=01; and
if MIN≦Di≦LMIN, then φi=00.

Figure 4:
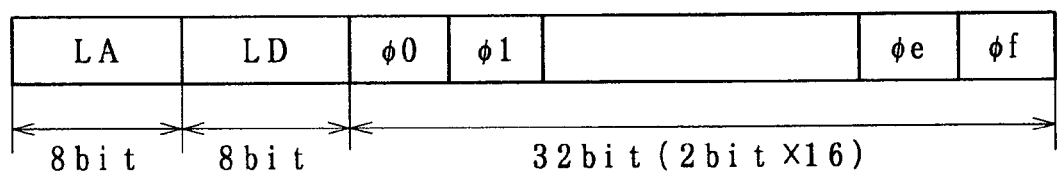
FIG. 4 is a chart which schematically shows fixed length compressed data.

At step (A4), data of the respective blocks are shaped into pieces of data with a fixed length. More specifically, as data indicating one block, the average gray level, the gray level width and the two-bit codes of the respective pixels are arranged (see FIG. 4). In the present embodiment, the data shaping is performed such that every piece of data indicating one block has six bytes. In each piece of block data, LA and LD indicate the characteristics of the block, and the remaining data of four bytes indicates the characteristics of the respective pixels.

Figure 5:
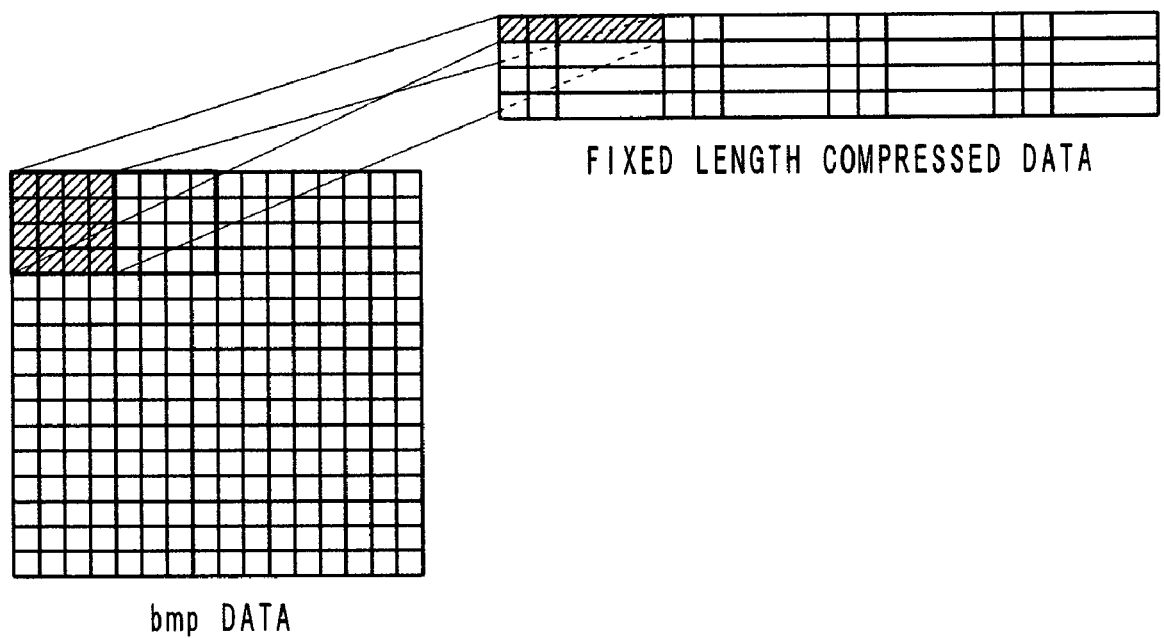
FIG. 5 is a chart which schematically shows conversion of bmp data into pieces of fixed length compressed data.

At step (A5), the above-described steps (A1) through (A4) are executed on a block-by-block basis, and an array of pieces of block data with a fixed length is formed. Thus, the entire image data is turned into an array of six-byte block data which is converted from data of 4×4 pixels (see FIG. 5). By following these steps, bmp data of 4×4 pixels (16-byte data) is converted into GBTC fixed length data (six-byte data), and the data size is compressed to ⅜.

Variable Length Compression

Next, as the second process of GBTC compression, variable length compression of the fixed length compressed data is described. The variable length compression is executed following the steps (B1) through (B3) described blow.

At step (B1), the fixed length block data is classified into the following four patterns depending on the gray levels of the pixels:
(A) all the pixels are 0, that is, the two-bit codes of the respective pixels are all "00";
(B) all the pixels are 0×FF, that is, the two-bit codes of the respective pixels are all "11";
(C) all the pixels are of the same level (except 0 or 0×FF), that is, the two bit codes of the respective pixels are all "01" or are all "10"; and
(D) all other cases, that is, the two-bit codes of the pixels are different.

At step (B2), the four patterns are expressed by variable length attribute bit codes (two-bit codes) as follows:
the pattern (A) is expressed by "00";
the pattern (B) is expressed by "01";
the pattern (C) is expressed by "10"; and
the pattern (D) is expressed by "11".

At step (B3), the data indicating one block is shaped by combining the variable length attribute code (two-bit code) and the two-bit codes of the pixels in the block(see FIG. 6). In the cases of patterns (A) and (B), the fixed length block data is replaced by only the two-bit variable length attribute code. In the case of pattern (C), the fixed length block data is replaced by the two-bit variable length attribute code and the average gray level of the block. In the case of pattern (D), the two-bit variable length attribute code is added before the fixed length block data (the average gray level, the gray level width and the two-bit codes of the pixels).

As is apparent from FIG. 6, in the cases of patterns (A), (B) and (C), the data size is very small compared with the fixed length data. In the case of pattern (D), because the two-bit variable length attribute code is added, the data size is increased.

A blank portion of an image is the pattern (A), and a thick portion (in which all the pixels are of the same gray level with respect to RGB) is the pattern (B) or (C). The pattern (D) indicates that the 4×4 pixels are of different gray levels, and the pattern (D) is less likely to appear than the patterns (A), (B) and (C) except that the image is intentionally formed. Therefore, by further performing the variable length compression as well as the fixed length compression, the data size is reduced more.

Expansion of Data

In order to expand the GBTC compressed data to multi-value bmp data, it is required to execute a process of expanding the variable length compressed data to fixed length compressed data and a process of expanding the fixed length compressed data to bmp data.

The first expansion process from the variable length compressed data to fixed length compressed data is executed following the steps (C1) through (C3) described below.

At step (C1), an expansion pattern of each block is selected from (A) through (D) according to the variable length attribute bit code as follows(see FIG. 6):
if the variable length attribute bit code is "00", a pattern (A) is selected;
if the variable length attribute bit code is "01", a pattern (B) is selected.
if the variable length attribute bit code is "10", a pattern (C) is selected; and
if the variable length attribute bit code is "11", a pattern (D) is selected.

When the patterns (A), (B) or (C) is selected, the two-bit codes for the respective pixels are produced based on the selected pattern. When the pattern (D) is selected, the variable length compressed data includes the two-bit codes of the respective 16 pixels.

At step (C2), fixed length compressed data is produced based on the variable length attribute bit code, the average gray level and the gray level width (see FIG. 7). In the case of pattern (A), because the gray levels of all the pixels are "0", the average level and the gray level width are also "0". Further, two-bit codes of the respective pixels are all "0". In the case of pattern (B), because the gray levels of all the pixels are "0×FF", the average gray level is "0×FF", and the gray level width is "0". Further, the two-bit codes of the respective pixels are all "0".

In the case of pattern (C), because the gray levels of all the pixels are equal to each other, the value of one byte following the variable length attribute bit code is used as the gray level of all the pixels, and the gray level width is "0". Further, the two-bit codes of the respective pixels are all "0".

At step (C3), the variable length attribute bit code is deleted. In the case of pattern (D), because the variable length attribute bit code is followed by fixed length block data with six bytes, the first two bits of the data are deleted.

The second expansion process from the fixed length compressed data to eight-bit bmp data is executed in a pattern 1 or in a pattern 2 according to the variable length attribute bit code. The pattern 1 is selected when the average gray level is "0" or "0×FF" and when the gray level width is "0" (except that the average gray level is "0" or "0×FF"). The pattern 2 is selected when the gray level width is not "0".

In the pattern 1, all the 4×4 pixels in the block are of the same gray level, and if the average gray level of the block is "0", the value "0" is provided for all the 16 pixels. If the average gray level is "0×FF", the value "0×FF" is provided for all the 16 pixels. If the gray level width is "0", the value of the average gray level is provided for all the pixels.

In the pattern 2, the two-bit codes of the respective pixels are decoded. First, as FIG. 8a shows, the maximum level MAX and the minimum level MIN are calculated from the average gray level and the gray level width, and the values which divide the range between the MAX and the MIN equally into three are calculated.

Next, the two-bit codes of the respective pixels are expanded to eight-bit codes. More specifically, if the two-bit code is 11, it is converted into the maximum level MAX, and if the two-bit code is 10, it is converted into the value DD2 which is ⅓ lower than the MAX. If the two-bit code is 01, it is converted into the value DD1 which is ⅓ higher than the MIN, and if the two-bit code is 00, it is converted into the minimum level MIN.

Figure 8A:
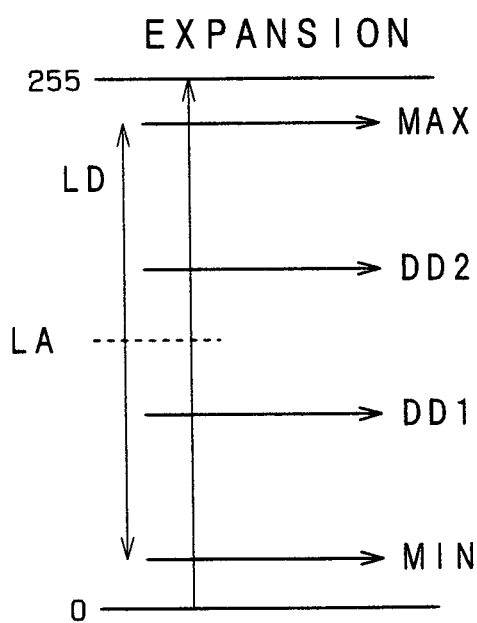
FIGS. 8a and 8b are charts which show a way of pixel data at the time of expansion and a way of converting pixel data at the time of compression, respectively.
Figure 8B:
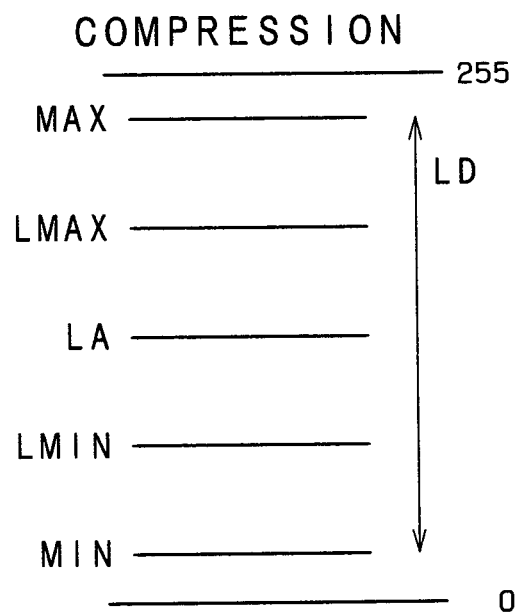

FIGS. 8a and 8b show a way of converting pixel data at the time of expansion and a way of converting pixels data at the time of compression, respectively. The image data compressed by GTBC is irreversible to the original multi-value bmp data. However, even when the data which was once submitted to the GTBC data compression and expansion is compressed and expanded by GTBC again, the picture quality will not degrade.

Combination of Compressed Image Data

Now, an example of image composition according to the present invention is described. In the present embodiment, for image composition, fixed length compressed data is used.

Figure 9:
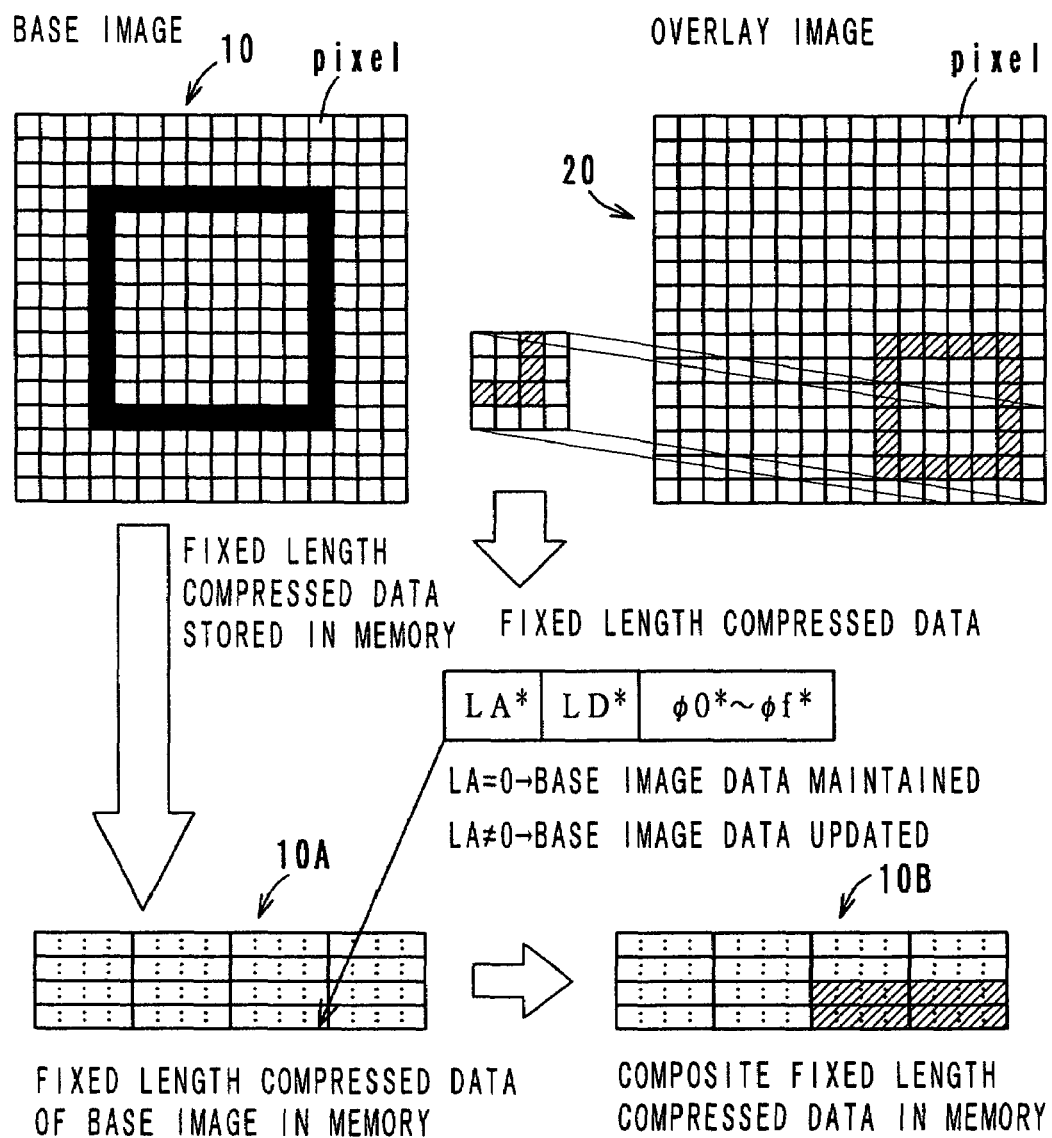
FIG. 9 is a chart which schematically shows image composition of a base image and an overlay image.

As FIG. 9 shows, a base image 10 is expressed by pieces of fixed length compressed data, and each piece of data indicates a block composed of 4×4 pixels. The fixed length compressed data of the base image 10 is stored in a memory. Also, an overlay image 20 is expressed by pieces of fixed length compressed data, and each piece of data indicates a block composed of 4×4 pixels. In the present embodiment, the images 10 and 20 are of the same size.

The fixed length compressed data of the base image 10 which is stored in the memory is updated or maintained in a block-by-block manner. Specifically, while the fixed length compressed data of the overlay image 20 is checked block by block, the following processes are carried out: when the average level LA of the overlay image 20 is "0", that is, when the block of the overlay image 20 is a blank portion, the data stored in the memory is not updated, that is, the data of the base image 10 is maintained; and on the other hand, when the average gray level LA of the overlay image 20 is not "0", that is, when the block of the overlay image 20 is an imaged portion, the data stored in the memory is updated to the block data of the overlay image 20.

In the case of FIG. 9, the overlay image 20 has an imaged portion in the right lower region, and in the four blocks corresponding to this region, the average gray levels LA are not "0". Therefore, the data of these blocks of the overlay image 20 is substituted for the data of the corresponding blocks of the base image 10. In FIG. 9, the fixed length compressed data of the base image 10 is denoted by 10A, and fixed length compressed data of a composite image is denoted by 10B.

The volume of the fixed length compressed data is smaller than that of bmp data, and the necessity of data updating is judged not in a pixel-by-pixel manner but in a block-by-block manner in accordance with the average gray level LA indicating a characteristic of the block. Consequently, the processing speed is high.

Expansion of Compressed Composite Image Data

As described above, compressed composite image data is made by replacing a part of fixed length block data of a base image with the same part of fixed length block data of an overlay image. Expansion of the compressed composite image data is carried out following the above-described steps for expansion of fixed length compressed data.

FIG. 10 shows expansion of the composite fixed length compressed data 10B to bmp data. In the present embodiment, a base image 10 and an overlay image 20 which are of the same size are combined with each other, and in a reproduced composite image 30, only the blocks including the imaged portion of the overlay image 20 is substituted for the corresponding blocks of the base image 10. There is no possibility that a non-imaged portion of the overlay image 20 will be substituted for the corresponding part of the base image 10, and there is no possibility that the base image 10 will be deleted unnecessarily.

In the reproduced composite image 30, there are blank pixels between the base image and the overlay image. The data expansion to reproduce the composite image 30 is carried out block by block (4×4 pixels), and therefore, in bmp data after the expansion, unnecessary data updating may occur at the most in 3 rows×3 columns of pixels. When the area of the base image to be replaced by the overlay image is white, such unnecessary data updating to white does not influence the picture quality of the composite image.

Main Routine for Image Composition

Figure 11:
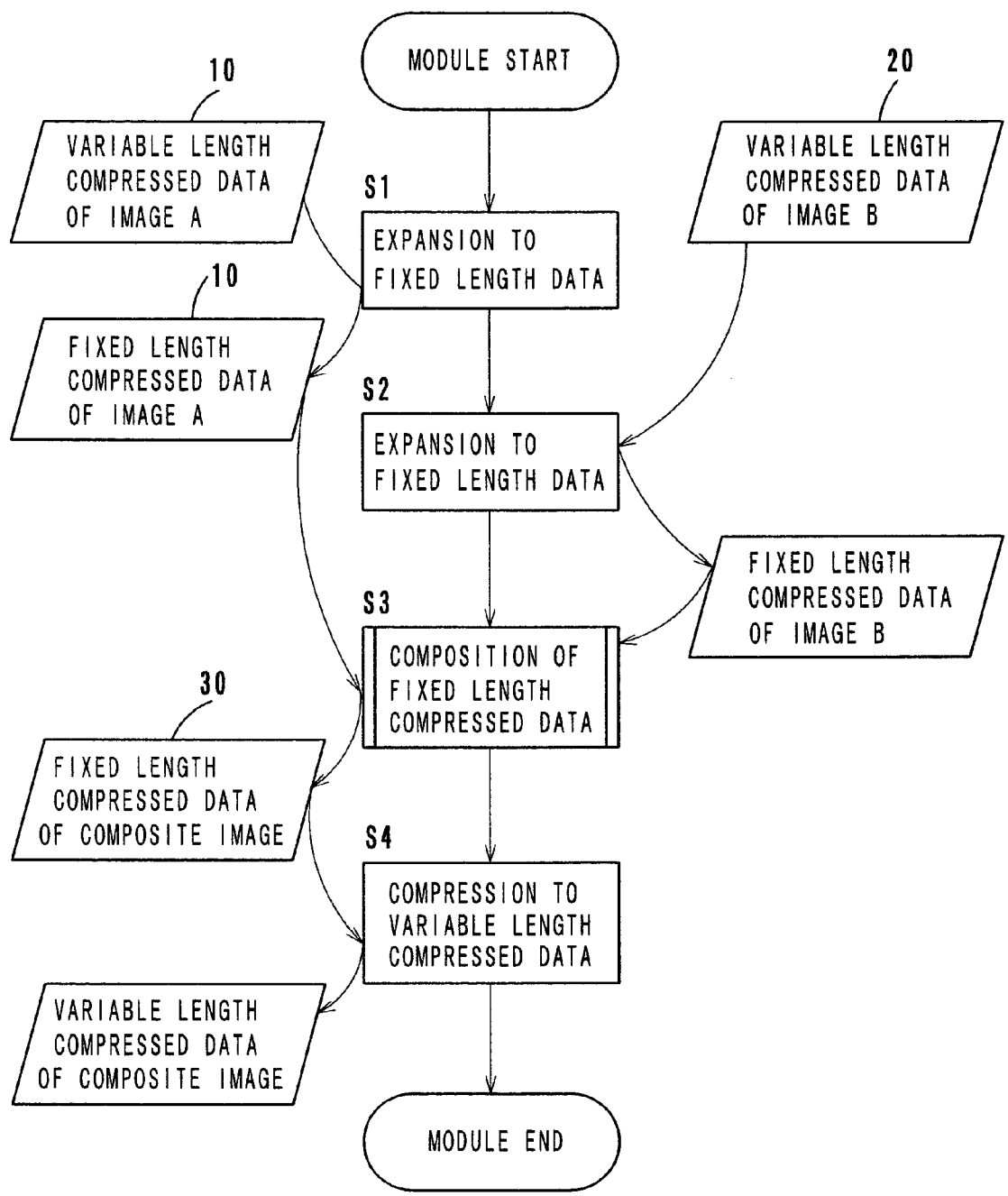
FIG. 11 is a flowchart which shows a main routine for image composition.

FIG. 11 shows a main routine for executing the above-described image composition. When a base image 10 is expressed by variable length compressed data, at step S1, the variable length compressed data is expanded to fixed length compressed data, and the fixed length compressed data is stored in a memory. When an overlay image 20 is expressed by variable length compressed data, at step S2, the variable length compressed data is expanded to fixed length compressed data.

Next, at step S3, the fixed length compressed data of the base image 10 is combined with the fixed length compressed data of the overlay image 20, and fixed length compressed data of a composite image 30 is produced. At step S4, the fixed length compressed data of the composite image 30 is compressed to variable length compressed data. Finally, the variable length compressed data is transmitted to an image control section as print data and expanded to fixed length compressed data and further to bmp data. Then, the composite image 30 is printed based on the bmp data.

First Example of Printing System

Figure 12:
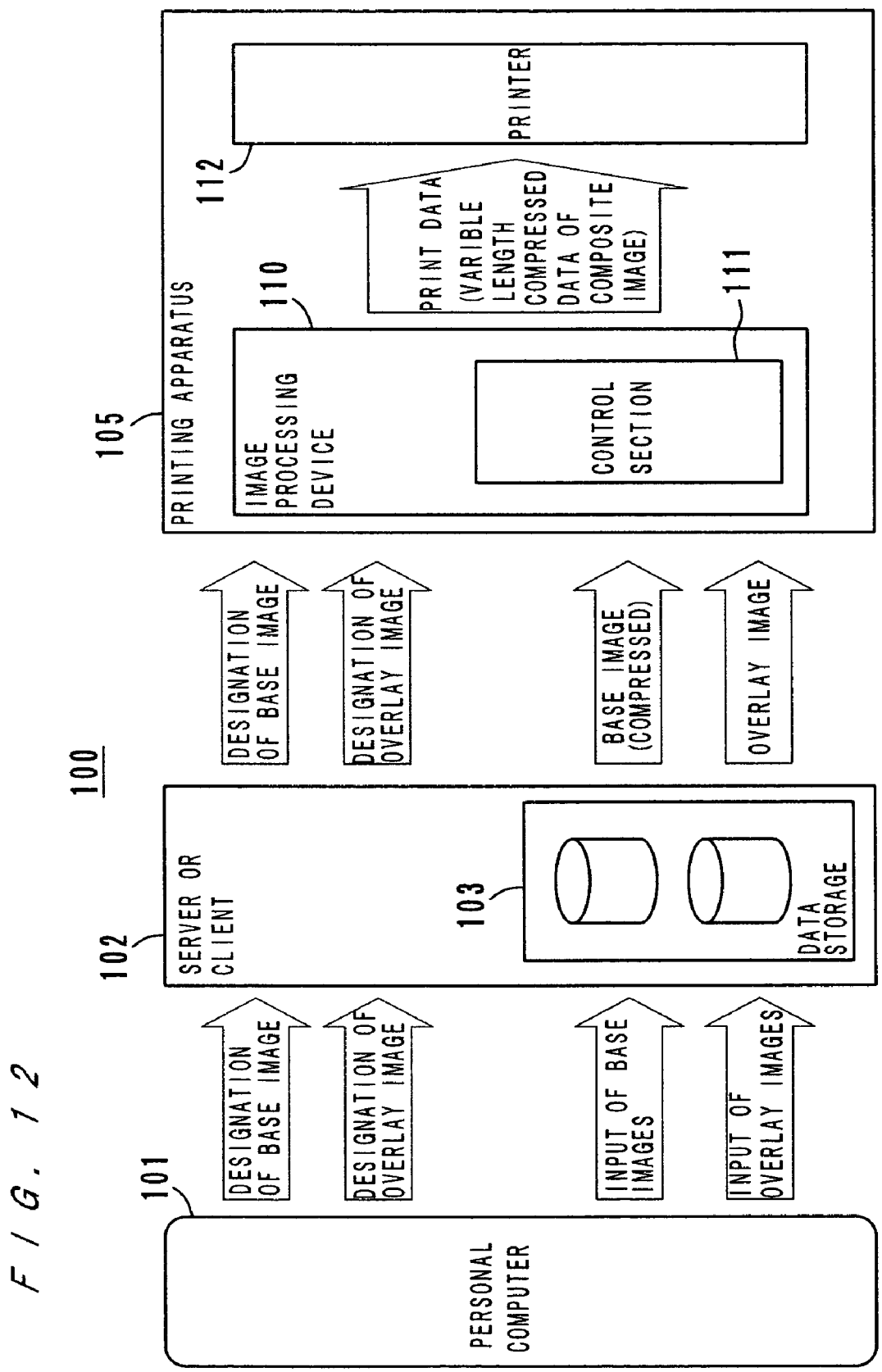
FIG. 12 is a block diagram which shows a first exemplary printing system.

Now, a first exemplary printing system which uses the image composing method according to the present invention is described. As FIG. 12 shows, this printing system comprises a personal computer 101 operated by a user, a server 102 provided with a data storage 103 and a printing apparatus 105. The printing apparatus 105 comprises an image processing device 110 provided with a control section 111 and a printer 112.

It is possible to input data of base images and data of overlay images from the personal computer 101 to the server 102 (the data is stored in the data storage 103), and a base image and an overlay image to be printed can be designated from the personal computer 101. When a print command of a composite image of a base image and an overlay image is made, the base image data and the overlay image data are transmitted to the image processing device 110. The data of base images stored in the data storage 103 is bmp data, fixed length compressed data or variable length compressed data.

The control section 111 of the image processing device 110 produces fixed length compressed data of a composite image by combining fixed length compressed data of the base image with fixed length compressed data of the overlay image by the above-described image composing method. Then, the control section 111 converts the fixed length composite image data into variable length compressed data and transmits the variable length compressed data to the printer 112 as print data. In the printer 112, the variable length compressed data is expanded to fixed length compressed data and further expanded to bmp data. Then, the printer 112 prints out the composite image based on the bmp data.

Second Example of Printing Sysetem

Figure 13:
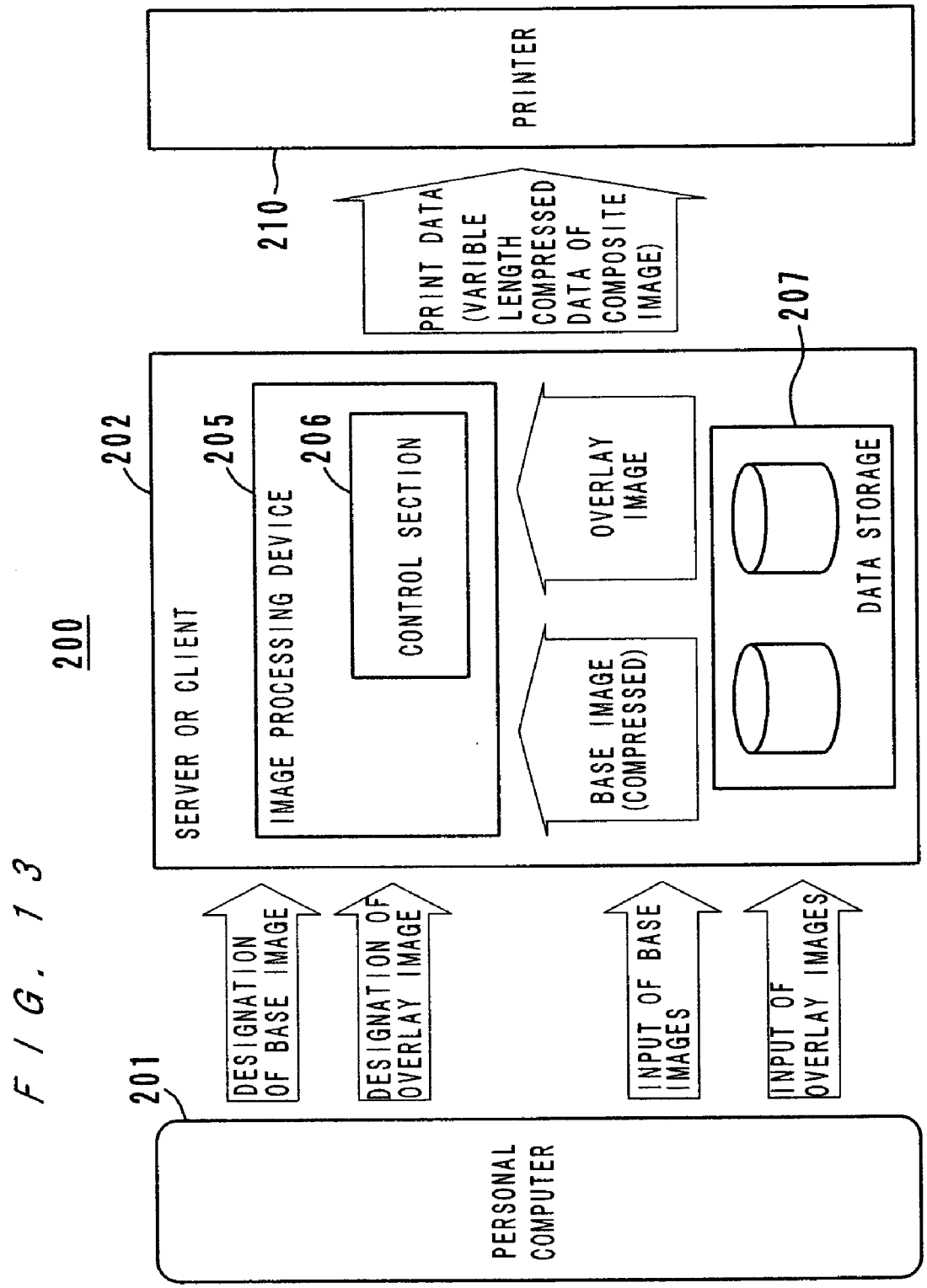
FIG. 13 is a block diagram which shows a second exemplary printing system.

Next, a second exemplary printing system which uses the image composing method according to the present invention is described. As FIG. 13 shows, this printing system comprises a personal computer 201 operated by a user, a server 202 and a printer 210. The server 202 comprises an image processing device 205 provided with a control section 206 which performs image composition, and a data storage 207.

It is possible to input data of base images and data of overlay images from the personal computer 201 to the server 202 (the data is stored in the data storage 207), and a base image and an overlay image to be printed can be designated from the personal computer 201. When a print command of a composite image of a base image and an overlay image is made, the base image data and the overlay image data are transmitted to the image processing device 205. The data of base images stored in the data storage 207 is bmp data, fixed length compressed data or variable length compressed data.

The control section 206 of the image processing device 205 produces fixed length compressed data of a composite image by combining fixed length compressed data of the base image with fixed length compressed data of the overlay image by the above-described image composing method. Then, the control section 206 converts the fixed length composite image data into variable length compressed data and transmits the variable length compressed data to the printer 210 as print data. In the printer 210, the variable length compressed data is expanded to fixed length compressed data and further expanded to bmp data. Then, the printer 210 prints out the composite image based on the bmp data.

Image Composing Routine 1

Figure 14:
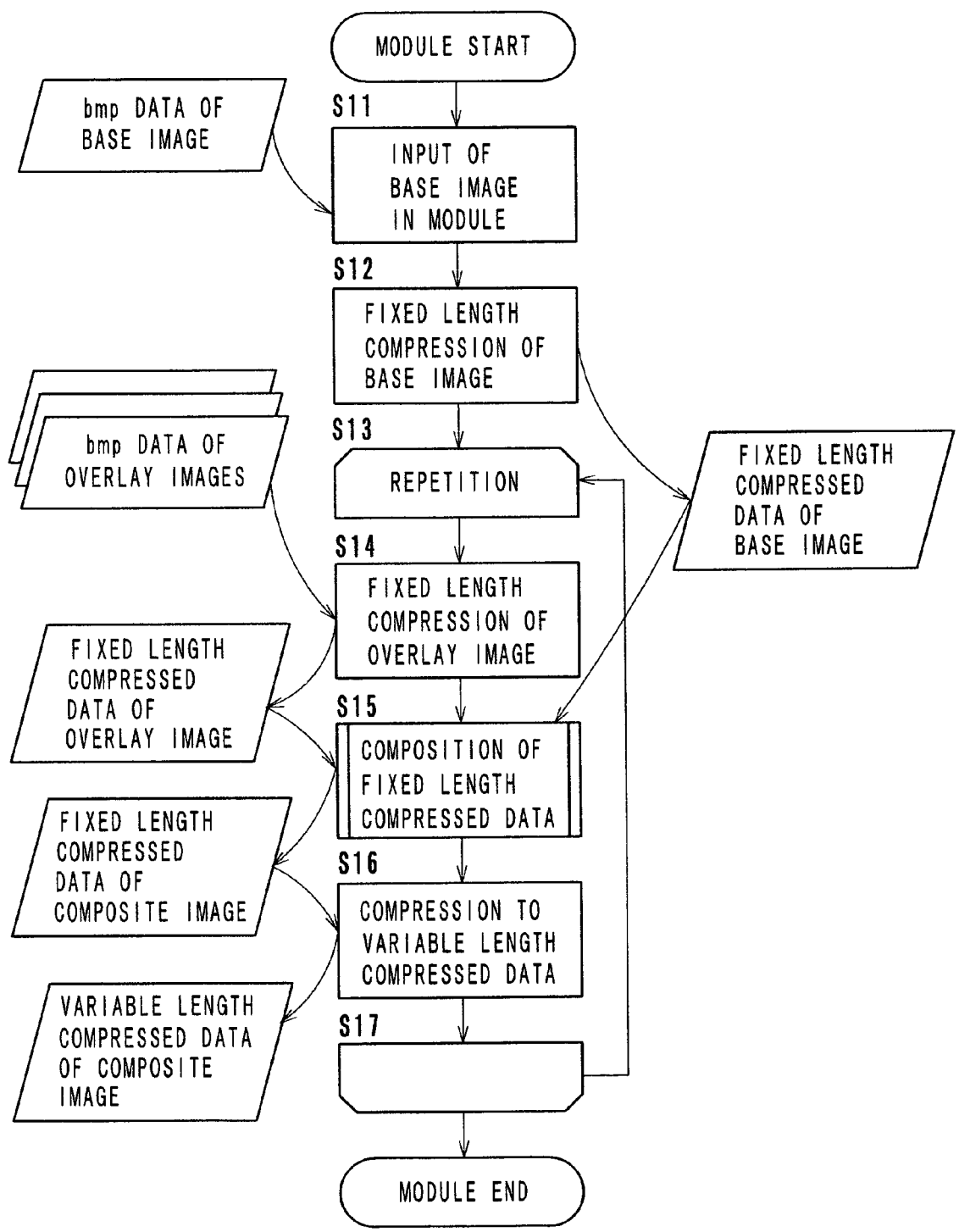
FIG. 14 is a flowchart which shows a first exemplary routine for image composition.

A first exemplary routine for image composition is described. This first routine is executed when both a base image and an overlay image are expressed by bmp data as shown in FIG. 14.

First, at step S11, the base image bmp data is input in a module, and at step S12, the bmp data is compressed to the fixed length compressed data. The overlay bmp data is compressed to the fixed length compressed data at step S14. Then, at step S15, the fixed length compressed data of the base image and the fixed length compressed data of the overlay image are combined with each other. Next, the composite fixed length compressed data is compressed to the variable length compressed data at step S16. The variable length compressed data is transmitted to the printer 112 or 210. Then, the routine from step S13 is repeated, and new overlay images are superimposed on the base image successively.

Image Composing Routine 2

Figure 15:
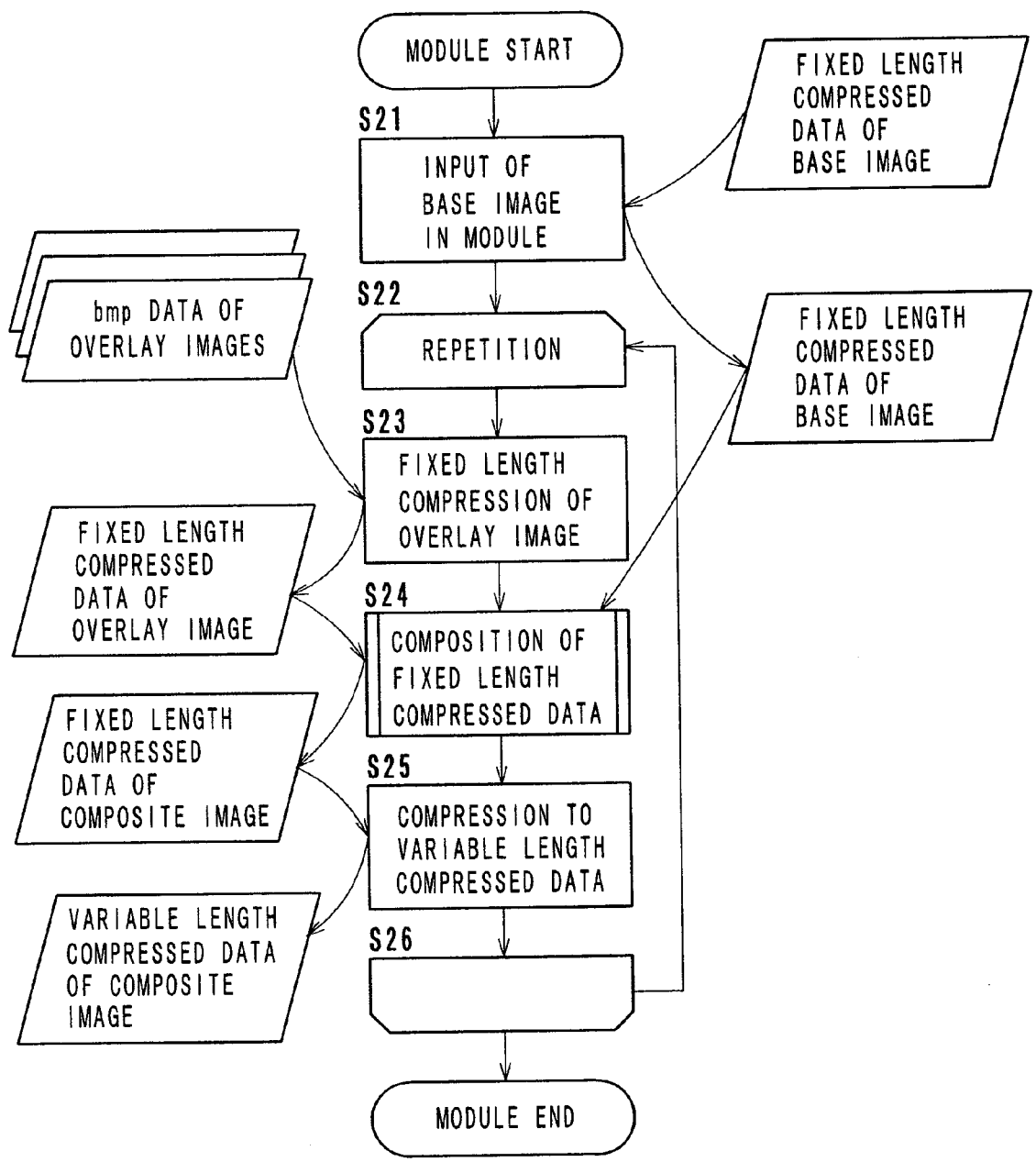
FIG. 15 is a flowchart which shows a second exemplary routine for image composition.

A second exemplary routine for image composition is executed when a base image is stored as fixed length compressed data and when an overlay image is expressed by bmp data as shown in FIG. 15.

First, at step S21, the fixed length compressed data of the base image is input in a module, and at step S23, the overlay image bmp data is compressed to the fixed length compressed data. Then, at step S24, the fixed length compressed data of the base image and the fixed length compressed data of the overlay image are combined with each other. Next, at step S25, the composite fixed length compressed data is compressed to the variable length compressed data. The variable length compressed data is transmitted to the printer 112 or 210. Then, the routine from step S22 is repeated, and new overlay images are superimposed on the base image successively.

Image Composing Routine 3

Figure 16:
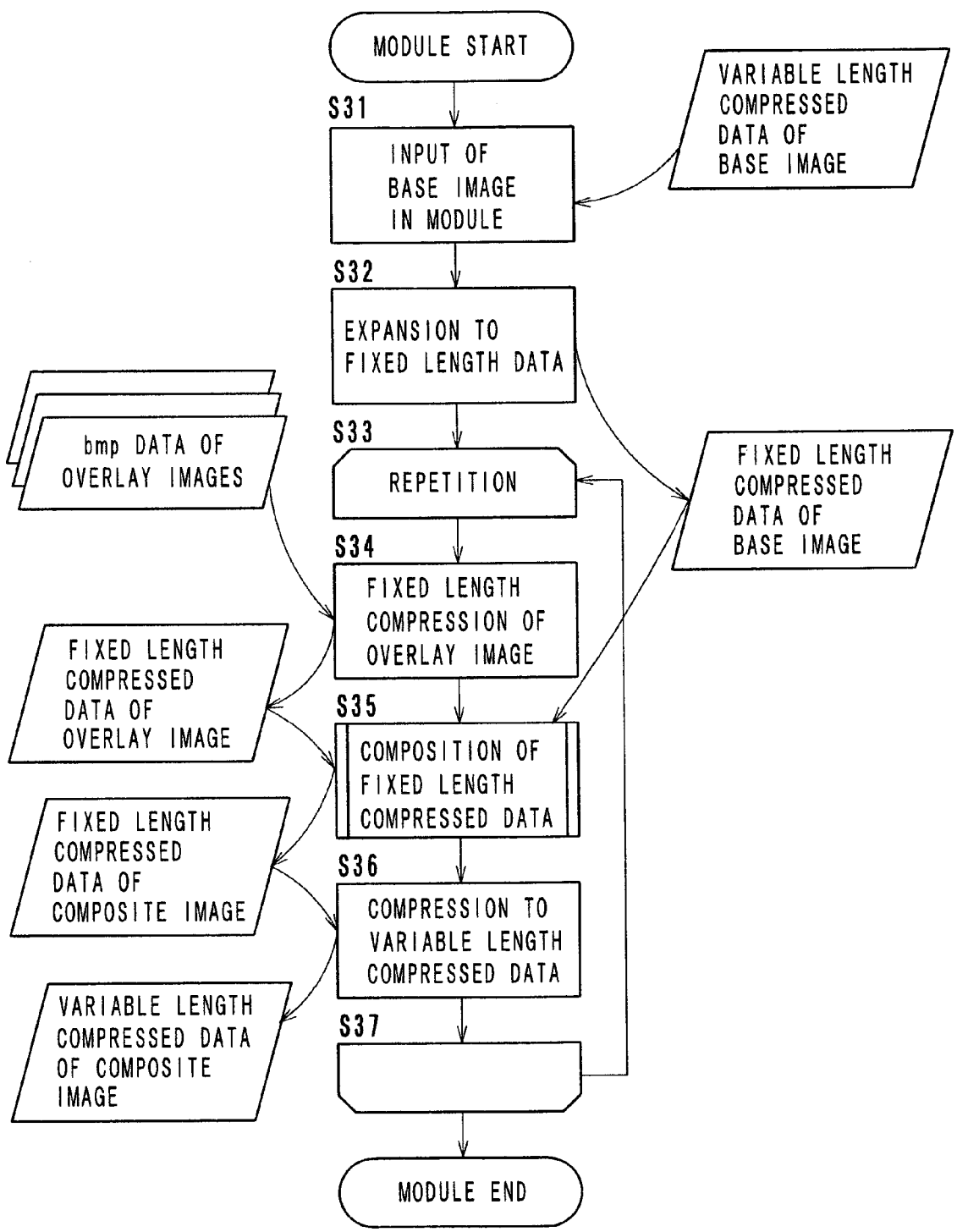
FIG. 16 is a flowchart which shows a third exemplary routine for image composition.

A third exemplary routine for image composition is executed when a base image is stored as variable length compressed data and when an overlay image exists as bmp data as shown in FIG. 16.

First, at step S31, the variable length compressed data of the base image is input in a module, and at step S32, the variable length compressed data is expanded to the fixed length compressed data. In the meantime, at step S34, the overlay image bmp data is compressed to the fixed length compressed data. Then, at step S35, the fixed length compressed data of the base image and the fixed length compressed data of the overlay image are combined with each other. Next, at step S36, the combined fixed length compressed data is compressed to the variable length compressed data. The variable length compressed data is transmitted to the printer 112 or 210. Then, the routine from step S33 is repeated, and new overlay images are combined with the base image successively.

Fixed Length Compressed Data Combining Subroutine 1

Next, a first exemplary subroutine for combining fixed length compressed data which is executed at steps S15, S24 and S35 is described.

Figure 17:
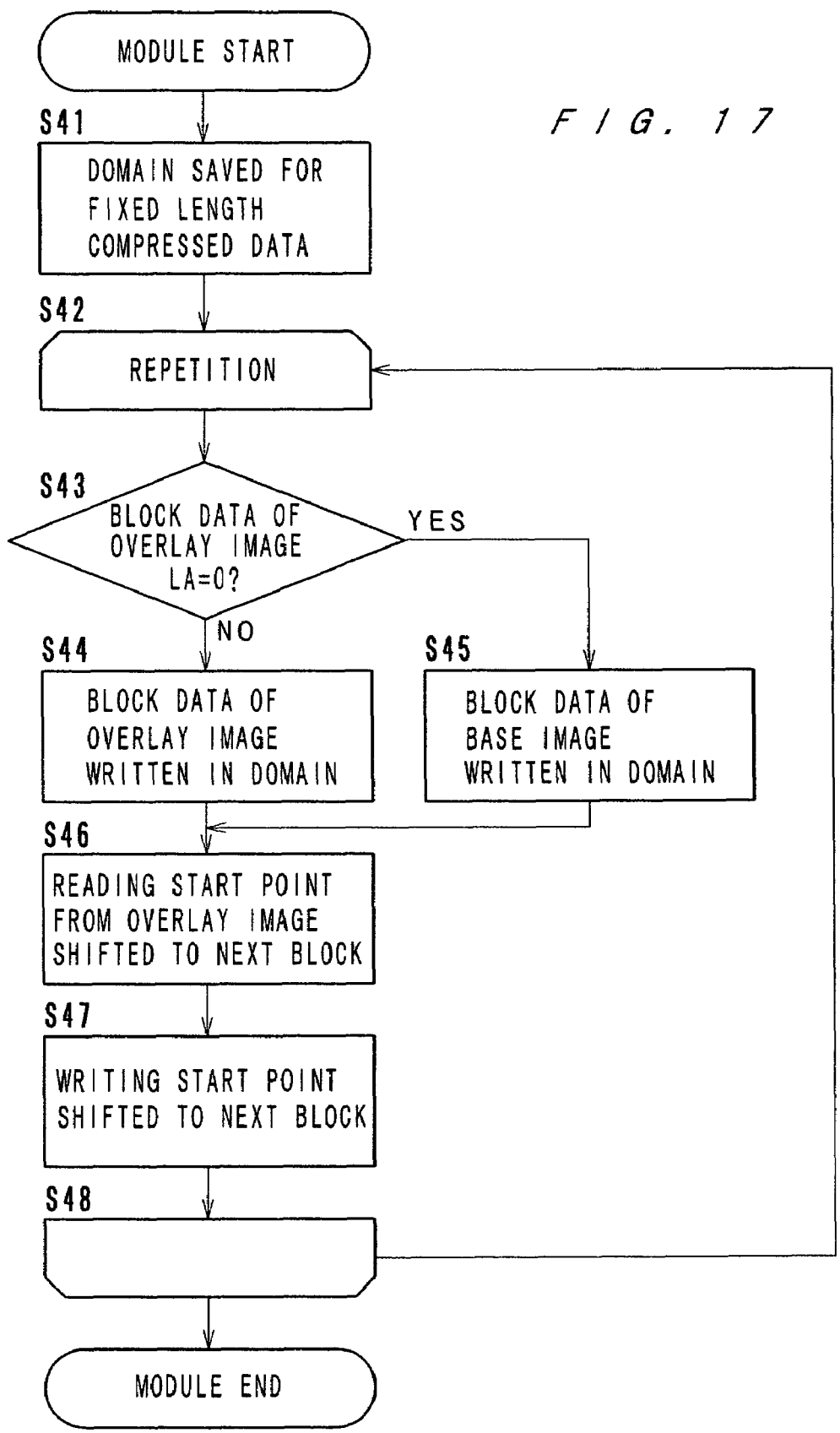
FIG. 17 is a flowchart which shows a first exemplary subroutine for combining fixed length compressed data.

FIG. 17 shows this first exemplary subroutine. First, at step S41, a domain with a sufficient capacity is saved for fixed length compressed data of a composite image to be formed. Here, the domain needs to have a capacity which is only $6/16$ of the volume of bmp data. Next, at step S43, the average gray level LA of a block of the overlay image is judged whether to be 0 or not. In other words, it is judged whether the gray level of the block composed of 4×4 pixels is 0. At step S43, only the average gray level LA which is the first byte of the six-byte fixed length block data is judged.

When the average gray level LA is not 0 ("NO" at step S43), it means that the block is an imaged portion of the overlay image, and at step S44, the fixed length block data of the overlay image is written in the domain. When the average level LA is 0 ("YES" at step S43), it means that the block of the overlay image is a non-imaged portion, and at step S45, the fixed length data of the corresponding block of the base image is written in the domain. Thus, at steps S44 and S45, six bytes of data are written at one time.

Next, at step S46, the start point of data reading from the overlay image is shifted to the next block, and at step S47, the start point of data writing into the memory is shifted to the next block. Then, the routine from step S42 is repeated to judge the average gray levels LA of all the blocks, and data of the base image or data of the overlay image is written block by block. Thus, composite image data of a base image and an overlay image is formed in the stage of fixed length compressed data, and the volume of data handled in this case is $1/16$ of that in the case of handling bmp data.

Fixed Length Compressed Data Combining Subroutine 2

Next, a second exemplary subroutine for combining fixed length compressed data which is executed at steps S15, S24 and S35 is described.

Figure 18:
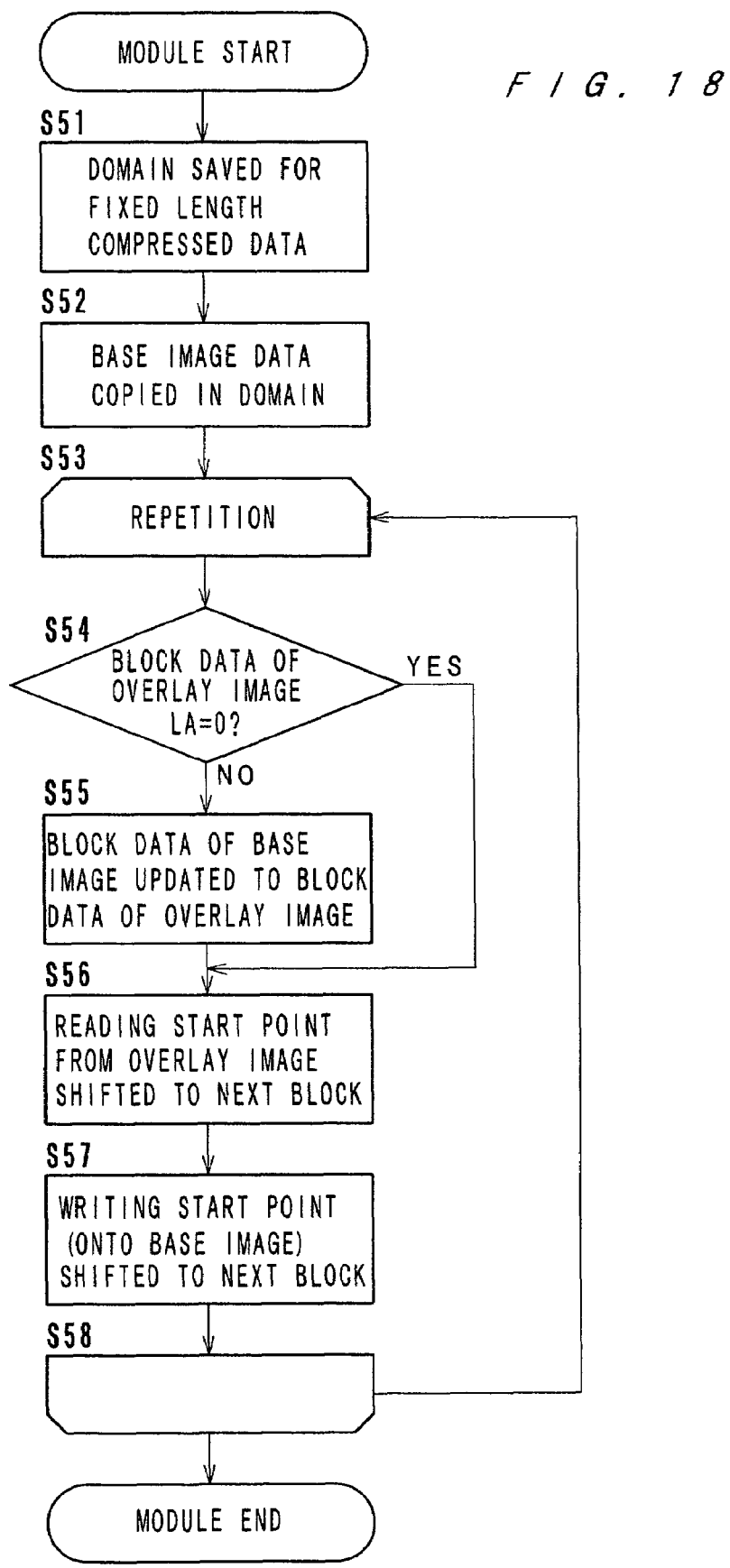
FIG. 18 is a flowchart which shows a second exemplary subroutine for combining fixed length compressed data.

FIG. 18 shows the second exemplary subroutine. First, at step S51, a domain with a sufficient capacity is saved for fixed length compressed data of a composite image to be formed. Here, the domain needs to have a capacity which is only $6/16$ of the volume of bmp data. Next, at step S52, the fixed length compressed data of the base image is copied in the domain. In this moment, the volume of copied data is only $6/16$ of bmp data.

Next, at step S54, the average gray level LA of a block of the overlay image is judged whether to be 0 or not. In other words, it is judged whether the gray level of the block composed of 4×4 pixels is 0. At step S54, only the average gray level LA which is the first byte of the six-byte fixed length block data is judged.

When the average gray level LA is not 0 ("NO" at step S54), it means that the block is an imaged portion of the overlay image, and at step S55, the corresponding block data of the base image is replaced with the block data of the overlay image. When the average gray level LA is 0 ("YES" at step S54), it means that the block of the overlay image is a non-imaged portion, and the corresponding block data of the base image is maintained. At steps S55, six bytes of data are updated at one time.

Next, at step S56, the start point of data reading from the overlay image is shifted to the next block, and at step S57, the start point of data writing onto the base image is shifted to the next block. Then, the routine from step S53 is repeated to judge the average gray levels LA of all the blocks, and it is judged what blocks of the base image are to be replaced with the corresponding blocks of the base image. Thus, composite image data of a base image and an overlay image is formed in the stage of fixed length compressed data, and the volume of data handled in this case is $1/16$ of that in the case of handling bmp data.

The image composing method according to the present invention, which is shown by flowcharts of FIG. 11 and FIGS. 14 through 18 can be implemented by a hard logic circuit for the purpose only or by a software. In the former case, the control section (111 or 206) of the image processing device (110 or 205 shown in FIG. 12 or 13) forms an image processing circuit exclusively used for executing the image composing method. In the latter case, the image processing device (110 or 205) incorporates a computer program for commanding the computer to execute the image composing method in a storage (not shown), or the computer intakes such a computer program from a network and has the control section (111 or 206) execute the program.

Other Embodiments

In the above-described embodiment, a base image and an overlay image which are of the same size are combined with each other, but it is possible to combine images of different sizes. Data of a composite image may be transmitted to the printer 112 or 210 in the stage of fixed length compressed data. The construction of the printing system 100 and 200 may be arbitrarily designed.

Although the present invention has been described in connection with the preferred embodiments above, it is to be noted that various changes and modifications are possible to those who are skilled in the art. Such changes and modifications are to be understood as being within the scope of the present invention.

What is claimed is:

1. An image processing device for forming a composite image by superimposing an overlay image on a base image, said image processing device comprising:

a fixed length data forming section for forming fixed length compressed data of the base image and fixed length compressed data of the overlay image by dividing data of the base image and data of the overlay image respectively into a plurality of blocks and by encoding a statistical parameter of each block, including a gray level representing the block, and quantization levels of respective pixels in the block; and an image composing section for forming fixed length compressed data of a composite image by, while checking the fixed length compressed data of the base image and the fixed length compressed data of the overlay image in a block-by-block manner, taking in the fixed length compressed data of the base image if the gray level of the block of the overlay image is 0 and taking in the fixed length compressed data of the overlay image if the gray level of the block of the overlay image is not 0.

2. An image processing device according to claim 1, further comprising:

a variable length data forming section for converting the fixed length compressed data of the composite image into variable length compressed data by quantizing the pixels of each block.

3. An image processing device according to claim 1, wherein the base image and the overlay image are of a same size.

4. An image processing device according to claim 1, wherein a plurality of overlay images are superimposed on one base image successively.

5. An image processing device according to claim 1, wherein:

the overlay image is expressed by bit map data; and
the fixed length data forming section converts the bit map data into fixed length compressed data.

6. An image processing device according to claim 1, wherein:

the base image is expressed by bit map data; and
the fixed length data forming section converts the bit map data into fixed length compressed data.

7. An image processing device according to claim 1, wherein the base image is expressed by fixed length compressed data.

8. An image processing device according to claim 1, wherein:

the base image is expressed by variable length compressed data; and
the fixed length data forming section converts the variable length compressed data into fixed length compressed data.

9. A computer readable medium encoded with an image processing program for commanding a computer to form a composite image by superimposing the overlay image on the base image, said program comprising the steps of:

forming fixed length compressed data of the base image and fixed length compressed data of the overlay image by dividing data of the base image and data of the overlay image respectively into a plurality of blocks and by encoding a statistical parameter of each block, including a gray level representing the block, and quantization levels of respective pixels in the block; and forming fixed length compressed data of a composite image by, while checking the fixed length compressed data of the base image and the fixed length compressed data of the overlay image in a block-by-block manner, taking in the fixed length compressed data of the base image if the gray level of the block of the overlay image is 0 and taking in the fixed length compressed data of the overlay image if the gray level of the block of the overlay image is not 0.

10. The computer readable medium according to claim 9, further comprising the step of:

converting the fixed length compressed data of the composite image into variable length compressed data by quantizing the pixels of each block.

11. The computer readable medium according to claim 9, wherein the base image and the overlay image are of a same size.

12. The computer readable medium according to claim 9, wherein one base image is combined with a plurality of overlay images successively.

13. The computer readable medium according to claim 9, wherein:

the overlay image is expressed by bit map data; and
at the step of forming fixed length compressed data, the bit map data is converted into fixed length compressed data.

14. The computer readable medium according to claim 9, wherein:

the base image is expressed by bit map data; and
at the step of forming fixed length compressed data, the bit map data is converted into fixed length compressed data.

15. The computer readable medium according to claim 9, wherein the base image is expressed by fixed length compressed data.

16. The computer readable medium according to claim 9, wherein:

the base image is expressed by variable length compressed data; and
at the step of forming fixed length compressed data, the variable length compressed data is converted into fixed length compressed data.

17. A method for forming a composite image by superimposing an overlay image on a base image, said method comprising the steps of:

forming fixed length compressed data of the base image and fixed length compressed data of the overlay image by dividing data of the base image and data of the overlay image respectively into a plurality of blocks and by encoding a statistical parameter of each block, including a gray level representing the block, and quantization levels of respective pixels in the block; and forming fixed length compressed data of a composite image by, while checking the fixed length compressed data of the base image and the fixed length compressed data of the overlay image in a block-by-block manner, taking in the fixed length compressed data of the base image if the gray level of the block of the overlay image is 0 and taking in the fixed length compressed data of the overlay image if the gray level of the block of the overlay image is not 0.

* * * * *